United States Patent
Sato et al.

[11] Patent Number: 6,008,626
[45] Date of Patent: Dec. 28, 1999

[54] APPARATUS FOR PREVENTING DETERIORATION OF LITHIUM SECONDARY BATTERY

[75] Inventors: Noboru Sato, Toyko; Kazuhiro Araki; Naoki Maruno, both of Utsunomiya, all of Japan

[73] Assignee: Honda Giken Kogyo Kabushiki Kaisha, Tokyo, Japan

[21] Appl. No.: 09/063,436

[22] Filed: Apr. 21, 1998

[30] Foreign Application Priority Data

Apr. 24, 1997 [JP] Japan ................................ 9-107652

[51] Int. Cl.$^6$ .................................................. H01M 10/46
[52] U.S. Cl. .......................................... 320/132; 320/150
[58] Field of Search ..................................... 320/118, 125, 320/127, 132, 135, 150, DIG. 21; 324/428, 431, 433

[56] References Cited

U.S. PATENT DOCUMENTS 5,539,318  7/1996  Sasaki ........................................ 324/428
5,703,465  12/1997  Kinoshita et al. .

FOREIGN PATENT DOCUMENTS 8331769  12/1996  Japan .

*Primary Examiner*—Edward H. Tso
*Attorney, Agent, or Firm*—Nikaido, Marmelstein, Murray & Oram LLP

[57] ABSTRACT

When a battery with series-connected lithium secondary cells is charged to a high voltage, the capacity of the battery is prevented from being irreversibly deteriorated. If a battery current detected by a current sensor is small and a battery voltage detected by a voltage sensor is of a level (4.0 V) higher than a rated voltage (3.6 V) of each of the lithium secondary cells, then a switch is closed to connect a resistor to the battery thereby to forcibly discharge the battery. The voltage across the battery is now lowered to prevent the battery from being left to stand at a high voltage, and hence the capacity of the battery is prevented from being irreversibly deteriorated.

10 Claims, 4 Drawing Sheets

APPARATUS FOR PREVENTING DETERIORATION OF LITHIUM SECONDARY BATTERY

BACKGROUND OF THE INVENTION

1. Field of the Invention

The present invention relates to the art of prevention of deterioration of a reversible capacity which occurs when a lithium secondary battery as it is fully charged and has a high voltage is left to stand for a long period of time, and more particularly to an apparatus for preventing a lithium secondary battery from being deteriorated, for use on an electric vehicle which employs such a lithium secondary battery as an electric energy source.

2. Description of the Related Art

It has been confirmed in the art that lithium secondary batteries, unlike other secondary batteries such as nickel-hydrogen secondary batteries, suffer an irreversible deterioration that the fully charged capacity (reversible capacity) of a lithium secondary battery is reduced if the voltage across the lithium secondary battery is higher than a rated voltage (normally 3.6 V at room temperature) when the lithium secondary battery is left to stand while or after it is charged.

The irreversible deterioration is considered to take place because the cathode (of carbon) of the lithium secondary battery is covered with a layer of lithium carbonate ($LiCO_3$). Though the family of lithium secondary batteries has various types of lithium secondary batteries including lithium cobaltate secondary batteries, manganate lithium cobaltate secondary batteries, etc., and they are deteriorated to different degrees, the irreversible deterioration occurs in all those types of lithium secondary batteries.

Lithium secondary batteries are found as an electric energy source on electric vehicles, for example. In such an application, the instrument panel of electric vehicles has a remaining capacity meter as a counterpart of a fuel meter on gasoline-powered automobiles which are propelled by internal combustion engines.

The remaining capacity meter comprises, for example, a liquid crystal display unit for displaying bars to indicate the remaining capacity of lithium secondary batteries in the range from an empty level to a fully charged level.

Remaining capacity meters on electric vehicles are required to be accurate in the display of the remaining capacity. The inventor of the present application has proposed a process of calculating a quantity of deterioration of a lithium secondary battery charged at a high voltage to correct its remaining capacity, i.e., to reduce the remaining capacity, when the lithium secondary battery is detected as being left to stand at the high voltage, so that the remaining capacity of the lithium secondary battery will be determined with accuracy. For details, reference should be made to Japanese patent application No. 8-302171.

According to the proposed process, it is possible to accurately calculate a reduction in the capacity of the lithium secondary battery due to the quantity of irreversible deterioration of the lithium secondary battery charged at a high voltage, for thereby detecting the remaining capacity of the lithium secondary battery highly accurately.

However, the proposed process fails to prevent the lithium secondary battery from being deteriorated at the high voltage though it can accurately detect the remaining capacity of the lithium secondary battery to correct the fully charged capacity thereof.

SUMMARY OF THE INVENTION

It is a general object of the present invention to provide an apparatus for preventing a lithium secondary battery from being deteriorated when a voltage thereacross is high.

A principal object of the present invention is to provide an apparatus for forcibly discharging a lithium secondary battery to a remaining capacity at which the lithium secondary battery will not be deteriorated at a high voltage, for thereby preventing the lithium secondary battery from being deteriorated.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
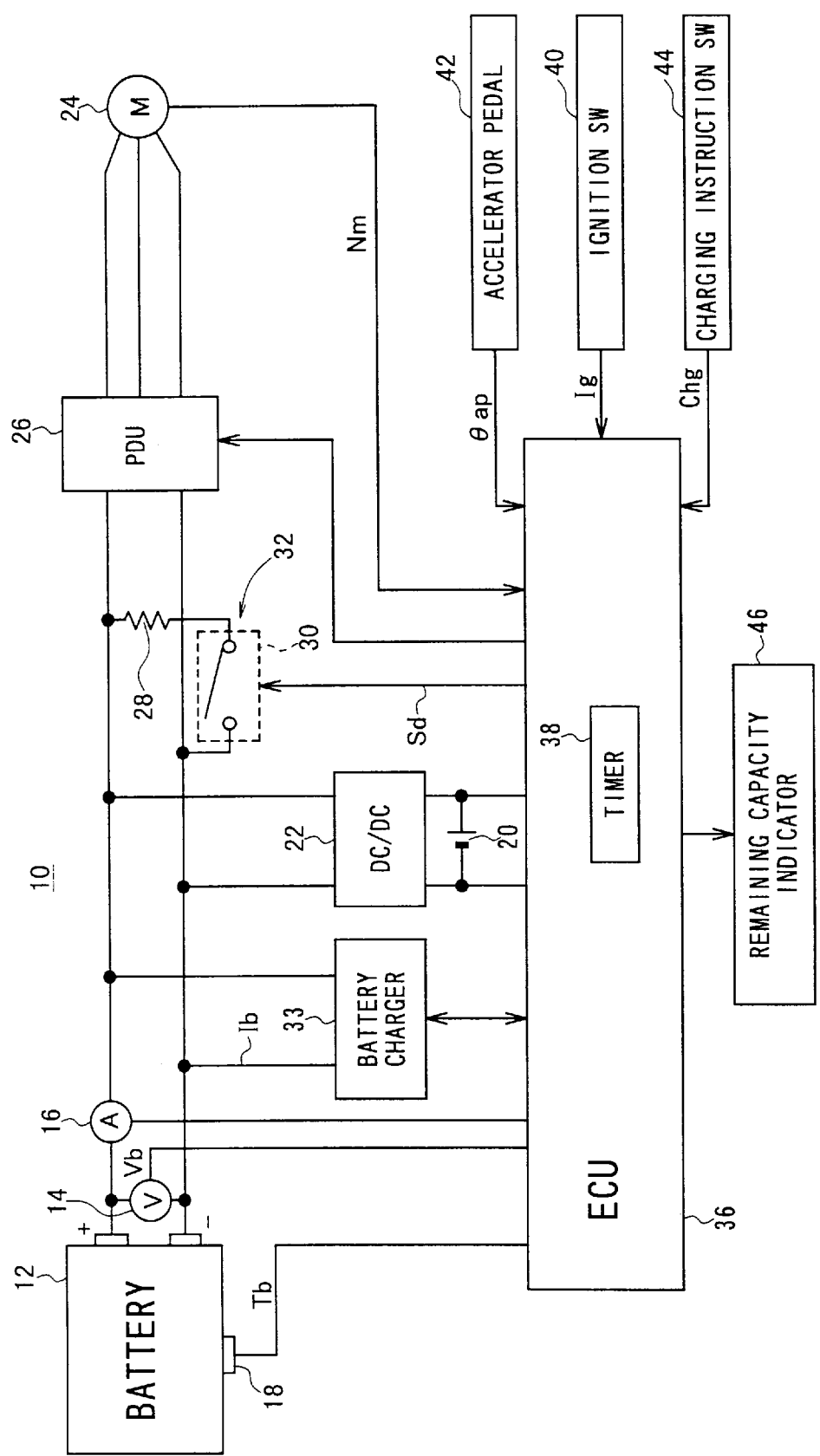
FIG. 1 is a block diagram of an electric vehicle which incorporates an apparatus for preventing a lithium secondary battery from being deteriorated according to the present invention.

FIG. 1 shows in block diagram an electric vehicle 10 which incorporates an apparatus for preventing a lithium secondary battery from being deteriorated according to the present invention.

As shown in FIG. 1, the electric vehicle 10 has a high-voltage battery 12 having a high rated voltage of +288 V across anode and cathode terminals thereof. The battery 12 comprises, for example, 80 series-connected lithium secondary cells each having a rated voltage of +3.6 V. A voltage sensor (voltage detecting means) 14 is connected to the battery 12 for detecting a battery voltage Vb thereof. A current sensor (current detecting means) 16 is connected to the battery 12 for detecting a battery current Ib thereof. A temperature sensor (temperature detecting means) 18 is attached to the battery 12 for detecting a temperature Tb thereof. The battery 12 is also referred to as a lithium secondary battery.

Between the anode and cathode terminals of the battery 12, there are connected a DC/DC converter 22 for charging an auxiliary battery 20 having a voltage of +12 V, a power drive unit (PDU) 26 for energizing a propulsive motor 24, which is a load of the battery 12, according to a PWM (Pulse Width Modulation) control process, a discharging circuit (discharging means) 32 comprising a resistor 28 and a switch 30, and a battery charger 33 which will be connected to an AC power supply (not shown) for charging the battery 12.

The electric vehicle 10 also has an ECU (Electric Control Unit) 36 operable as control, decision, processing, calculating, time measuring (timer 38) means. The ECU 32 is in the form of a microcomputer which comprises a CPU (Central Processing Unit), a ROM serving as memory means that stores a system program, an application program for preventing a lithium secondary battery from being deteriorated at a high voltage, and a lookup table, a RAM serving as working memory means for storing temporary data, a timer (time measuring means) 38 for measuring time, and input/output interfaces including an A/D converter and a D/A converter. Data stored in the RAM are backed up by the auxiliary battery 20 which serves as a power supply of the ECU 36.

The ECU 32 is supplied with the battery voltage Vb (V) from the voltage sensor 14, the battery current Ib (A) from the current sensor 16, the battery temperature Tb (°C.) from the temperature sensor 18, an ignition signal Ig generated as an on/off signal from an ignition switch (running selecting means) 40, an accelerator opening signal θap (°C.) from an accelerator pedal 42, a charging instruction signal Chg generated as an on/off signal from a charging instruction switch 44, and a rotational speed signal Nm (rpm) from an encoder attached to the propulsive motor 24. In the electric vehicle 10, the ignition switch 40 functions as an on/off switch for generating an on/off signal to energize and de-energize loads including the propulsive motor 24.

Based on the supplied signals, the ECU 36 controls the PDU 26 to determine an output torque to be produced by the propulsive motor 24, determines a level for an opening/closing control signal Sd for the switch 30 of the discharging circuit 32, determines a remaining capacity to be displayed on a remaining capacity indicator 46, and controls operation of the battery charger 33.

Figure 2:
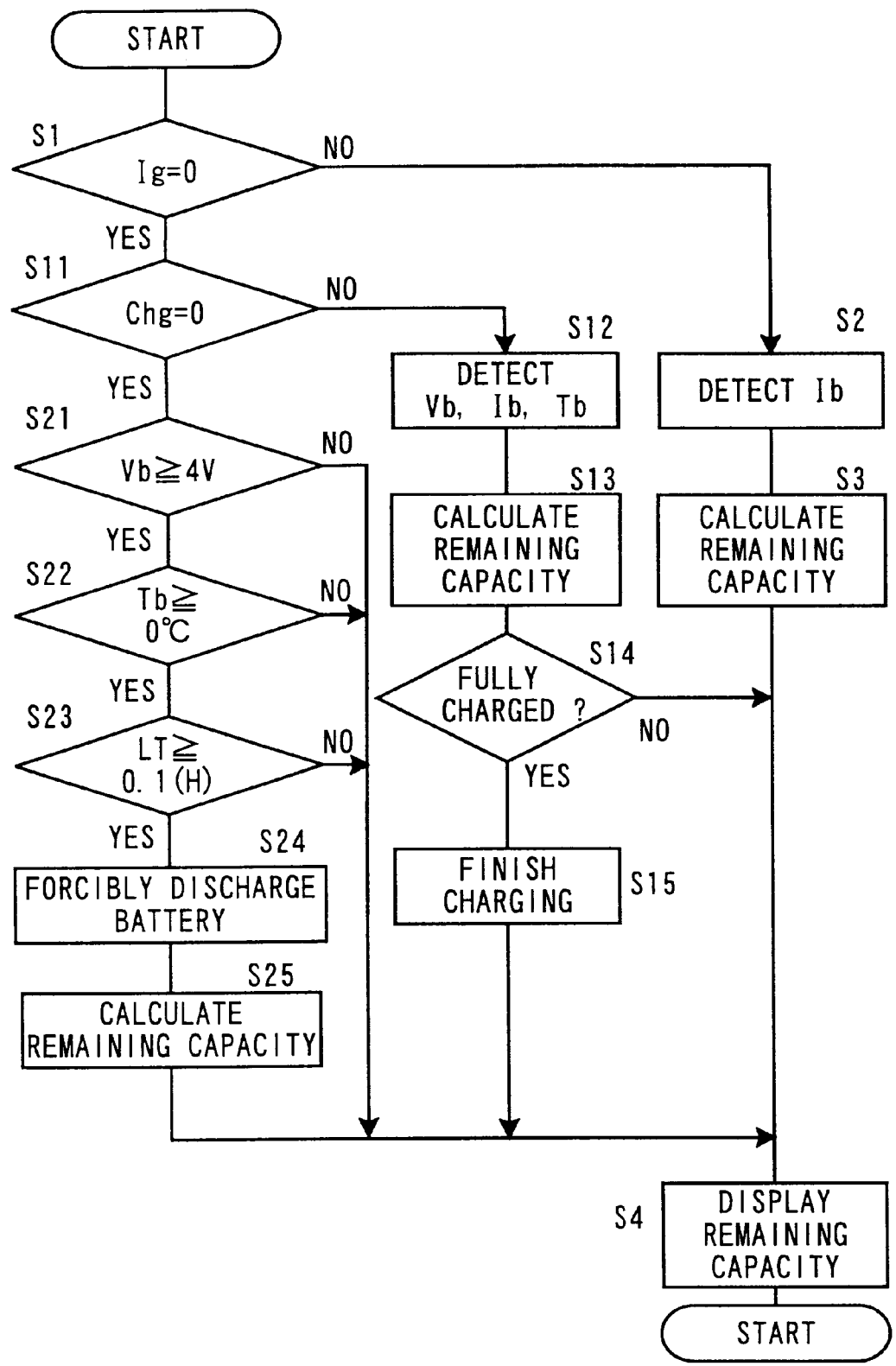
FIG. 2 is a flowchart of an operation sequence of the apparatus shown in FIG. 1.

A process carried out by the ECU 36 for preventing the battery 12 from being deteriorated will be described below with reference to FIG. 2.

The ECU 36 decides whether the ignition switch 40 is turned on or off based on the level of the ignition signal Ig in a step S1. If the ignition signal Ig is not Ig=0, then the electric vehicle is either running or capable of running, and the battery 12 is being discharged.

While the battery 12 is being discharged, a discharging current from the battery 12 is detected as the battery current Ib by the current sensor 16 in a step S2. The ECU 36 calculates a remaining capacity of the battery 12 according to the following equation (1):

$$\text{Remaining capacity} \leftarrow \text{remaining capacity} - \text{discharged capacity} \quad (1)$$

According to the equation (1), a present remaining capacity on the left side of the symbol ← is calculated by subtracting a discharged capacity (the battery current Ib×a predetermined discharging time) from the preceding remaining capacity stored in the RAM. The equation (1) indicates that the data stored in the RAM is updated from the remaining capacity on the right side of the symbol ← to the remaining capacity on the left side of the symbol ←. All equations including the symbol ← which will be described below should be interpreted as indicating the same operation.

Based on the calculated remaining capacity, the remaining capacity indicated on the remaining capacity indicator 46 is updated in a step S4. Control returns from the step S4 to the step S1.

If the ignition signal Ig is Ig=0 (it is an off signal) in the step S1, indicating that the electric vehicle is not running, then the ECU 36 decides whether the battery 12 is being charged on the basis of the level of the charging instruction signal Chg from the charging instruction switch 44 in a step S11. If the charging instruction signal Chg is Chg=1, then the ECU 36 carries out a battery charging process.

In the battery charging process, the ECU 36 reads the battery voltage Vb, the battery current Ib as a charging current, and the battery temperature Tb in a step S12.

The ECU 36 then calculates a remaining capacity according to the following equation (2) in a step S13:

$$\text{Remaining capacity} \leftarrow \text{remaining capacity} + \text{charged capacity} \times \text{charging efficiency} \quad (2)$$

According to the equation (2), a present remaining capacity on the left side of the symbol ← is calculated as the sum of a preceding remaining capacity stored in the RAM and the product of a charged capacity (the battery current Ib×a predetermined charging time) and a charging efficiency (which is a constant depending on the battery temperature Tb and ranging from 0.9 to 0.95, for example). The equation (2) indicates that the data stored in the RAM is updated from the remaining capacity on the right side of the symbol ← to the remaining capacity on the left side of the symbol ←.

Then, the ECU 36 decides in a step S14 whether the charging of the battery 12 is completed or not, i.e., whether the battery 12 is fully charged or not. The fully charged condition can be detected by detecting the rate at which the battery temperature rises (e.g., a first time differential dTb/dt of the battery temperature Tb) or the rate at which the battery voltage rises (e.g., a first time differential dVb/dt of the battery voltage Vb), as disclosed in Japanese laid-open patent publication No. 8-331769, for example.

If the battery 12 is fully charged, then the ECU 36 finishes the charging of the battery 12 in a step S15, and calculates and displays a remaining capacity on the remaining capacity indicator 46 in the step S4. If the battery 12 is not fully charged in the step S14, then the ECU 36 continuously charges the battery 12, and calculates and displays a remaining capacity on the remaining capacity indicator 46 in the step S4. In any case, control returns from the step S4 to the step S1.

If the electric vehicle is not running (YES in the step S1) and the battery 12 is not being charged (YES in the step S11), then the ECU 36 executes a battery deterioration prevention routine starting with a step S21.

In the battery deterioration prevention routine, the ECU 36 reads the battery voltage Vb and decides whether the battery voltage Vb is Vb≧4 V in the step S21. The voltage of 4 V represents the capacity of each lithium secondary cell. Since the rated voltage of a lithium secondary cell is 3.6 V, the battery voltage Vb to be compared in the step S21 is actually of a value obtained by dividing the read battery voltage Vb by 80 which is the number of the lithium secondary cells.

The voltage of 4 V also represents a predetermined threshold voltage at which the lithium secondary cells are expected to begin deteriorating, i.e., to start reducing the capacity irreversibly. The threshold voltage of 4 V is also referred to as Vth=4 V.

For fully charging the battery 12, each of the lithium secondary cells is charged at a high voltage of 4.2 V, for example.

If the battery voltage Vb is Vb<4 V in the step S21, then control leaves the battery deterioration prevention routine, and goes to the step S4 in which the ECU 36 calculates and displays a remaining capacity on the remaining capacity indicator 46. Thereafter, control returns from the step S4 to the step S1.

If the battery voltage Vb is Vb≧4 V in the step S21, indicating that the battery 12 has a high voltage, then the ECU 36 reads the battery temperature Tb, and decides whether the battery temperature Tb is Tb≧0° C. in a step S22. If Tb<0° C., then since the battery 12 is not deteriorated at the high voltage, control jumps to the step S4.

If Tb≧0° C., then since the battery 12 is likely to be deteriorated at the high voltage, the ECU 36 reads from the timer 38 a time LT for which the battery 12 has been left to stand at the high voltage, and decides whether the left-to-stand time LT is LT≧0.1 H (H: hours) in a step S23.

If the LT≧0.1 H, then the ECU 36 determines that the battery 12 will start to be deteriorated at the high voltage, and forcibly discharges the battery 12 in order to prevent the battery 12 from being deteriorated in a step S24. Specifically, the ECU 36 changes the opening/closing control signal Sd from a low level to a high level, thus closing the switch 30. The battery 12 is now discharged through the resistor 28 and the switch 30.

Figure 3:
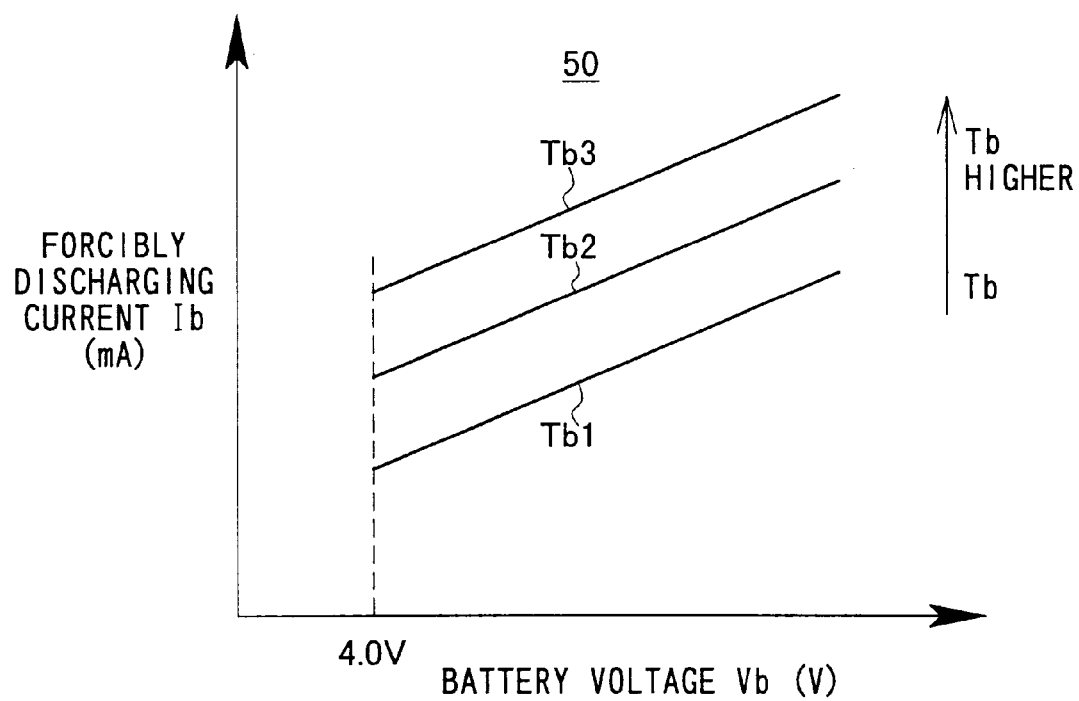
FIG. 3 is a diagram showing a table of forced discharging rates.

Actually, the ECU 36 determines the battery current (forcibly discharging current) Ib flowing from the battery 12 when it is forcibly discharged by referring to a table 50 of forced discharging rates (see FIG. 3). As shown in FIG. 3, the higher the battery temperature Tb (Tb3>Tb2>Tb1) and the higher the battery voltage (left-to-stand voltage) Vb is than Vb=4.0 V, the greater the forcibly discharging current Ib. The table 50 of forced discharging rates is stored as a lookup table in the ROM or as a calculating formula in the ROM. In order to actually change the forcibly discharging current Ib, a plurality of sets of resistors 28 having different values, i.e., different weights 1, 2, 4, 8, . . . , and switches 30 connected in series thereto are connected parallel to each other between the anode and cathode terminals of the battery 12, and selectively activated by opening/closing control signals Sd from the ECU 36.

When the battery 12 is forcibly discharged, the ECU 36 calculates a remaining capacity according to the following equation (3):

$$\text{Remaining capacity} \leftarrow \text{remaining capacity} - \text{forced discharging current} \times \text{discharged time} \quad (3)$$

In the equation (3), the forced discharging current is detected by the current sensor 16, and the discharged time is detected by the timer 38. Thereafter, control goes to the step S4 and then back to the step S1.

Figure 4:
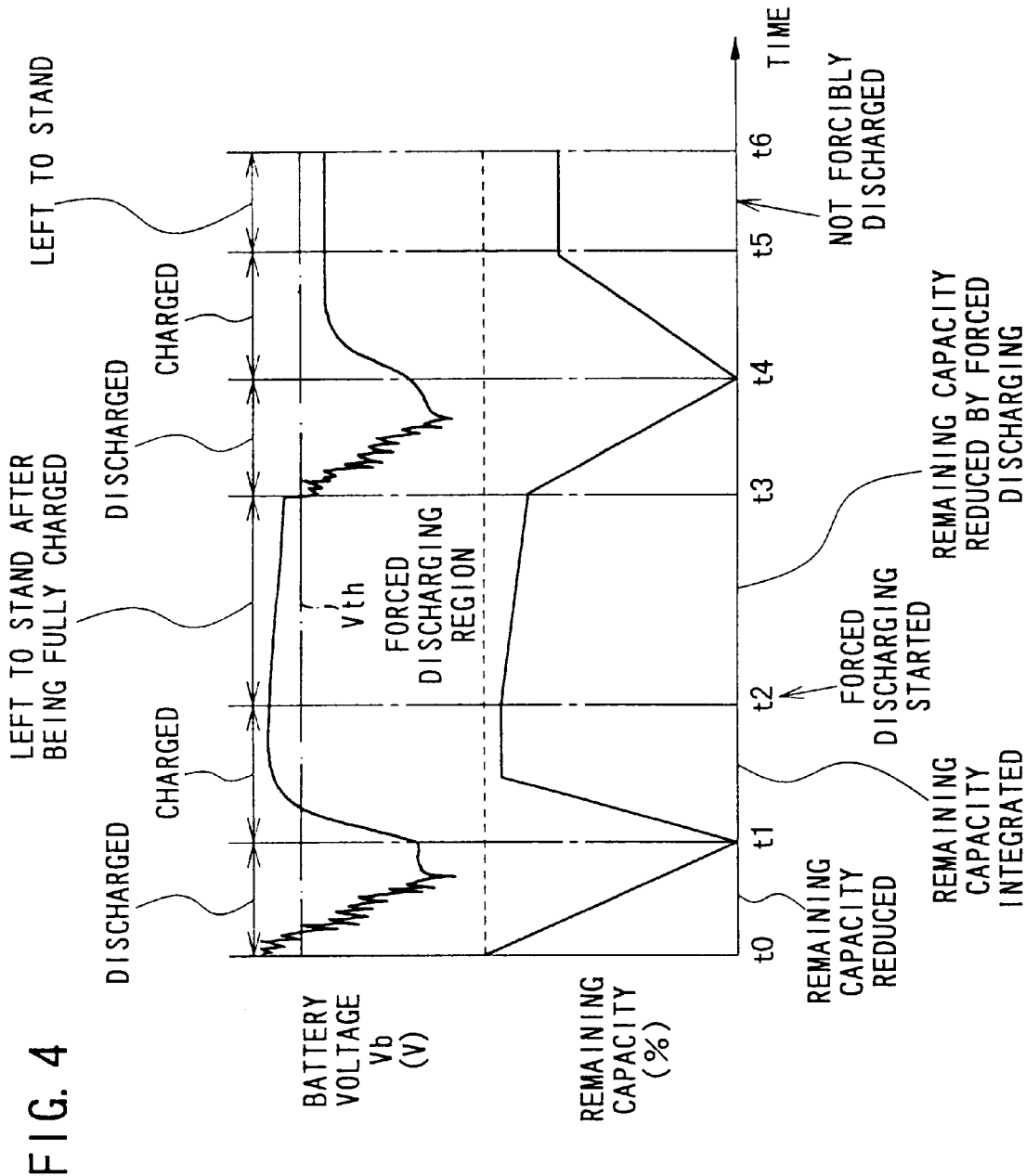
FIG. 4 is a timing chart illustrative of the operation sequence of the apparatus shown in FIG. 1.

The above process carried out by the ECU 36 will be described below with reference to FIG. 4.

The electric vehicle runs during a period from a time t0 to a time t1. In this period, the battery voltage Vb gradually decreases, and the remaining capacity is reduced according to the equation (1). The battery 12 is charged during a period from the time t1 to a time t2. In this period, the remaining capacity is integrated according to the equation (2). Between the time t1 and the time t2, the battery voltage Vb exceeds the threshold voltage Vth where the battery 12 starts being deteriorated, but the battery 12 is not forcibly discharged because the battery 12 does not suffer deterioration while it is being charged. The battery 12 is fully charged at the time t2. When the battery 12 is subsequently left to stand, the battery 12 starts to be forcibly discharged, and the remaining capacity is reduced according to the equation (3). When the battery 12 is left to stand after it is fully charged, the battery 12 is forcibly discharged until the battery voltage Vb drops to the threshold voltage Vth.

At a time t3, the electric vehicle starts to run again. During a period from the time t3 to a time t4, the remaining capacity is reduced according to the equation (1). At a time t4, the battery 12 starts to be charged. The battery 12 which has not been fully charged starts to be left to stand at a time t5. Since the battery voltage Vb does not exceed the threshold voltage Vth, the battery 12 is not forcibly discharged during a period from the time t5 to a time t6.

In the above embodiment, as described above, when the battery 12, which comprises lithium secondary cells that will be irreversibly deteriorated when left to stand after being charged to a high voltage, is detected as left to stand after being charged to a high voltage, the battery 12 is forcibly discharged with a current which is smaller than a discharging current that flows when the electric vehicle actually runs (during the period from the time t0 to the time t1, for example), as can be seen from a gradual downward gradient of the remaining capacity curve from the time t2 to the time t3, so that the battery 12 is prevented from being deteriorated with respect to the fully charged capacity (reversible capacity). Even while the battery 12 is being forcibly discharged, the remaining capacity thereof is calculated or corrected, and hence the remaining capacity displayed on the remaining capacity indicator 46 is accurate at all times.

In the step S21 of the battery deterioration prevention routine, the ECU 36 decides whether the battery 12 has a high voltage or not by deciding whether or not the battery voltage Vb is equal to or higher than the threshold voltage Vth. However, the ECU 36 may decide whether or not the remaining capacity of the battery 12, which is strongly correlated to the high voltage of the battery 12, is equal to or greater than a predetermined remaining capacity level. Specifically, the ECU 36 may decide in the step S21 whether or not the remaining capacity of the battery 12 is equal to or greater than 80% (predetermined remaining capacity level) of the fully charged capacity of the battery 12.

The ECU 36 may decide whether the battery 12 has been left to stand by checking the battery current Ib rather than the ignition signal Ig in the step S1. Specifically, the ECU 36 may determine that the battery 12 has been left to stand (YES in the step S1) if the battery current (discharging or charging current) Ib is smaller than a predetermined current Is (Ib<Is).

Furthermore, rather than passing the discharging current through the resistor 28 to dissipate heat when the battery 12 is forcibly discharged in the step S24, the discharging current may be supplied to an electric energy storage medium connected in place of the resistor 28. Specifically, the electric energy storage medium may comprise a capacitor (having an electrostatic capacitance), a lithium secondary battery which is charged to a relatively low level, a lead battery, or the like. The electric energy thus stored in the electric energy storage medium by the discharging current from the forcibly discharged battery 12 may be used effectively as electric energy for energizing the propulsive motor 24.

With the arrangement of the present invention, as described above, when the lithium secondary battery is liable to be deteriorated after being charged to a high voltage, the lithium secondary battery is forcibly discharged. Therefore, the lithium secondary battery will not be left to stand after it has been fully charged or nearly fully charged, and hence is prevented from being deteriorated.

As a consequence, the lithium secondary battery has a longer service life.

The lithium secondary battery may comprise a single lithium secondary cell as well as a plurality of lithium secondary cells.

Although a certain preferred embodiment of the present invention has been shown and described in detail, it should be understood that various changes and modifications may be made therein without departing from the scope of the appended claims.

What is claimed is:

1. An apparatus for preventing a lithium secondary battery from being deteriorated, comprising:

a lithium secondary battery;

left-to-stand condition detecting means for detecting when said lithium secondary battery is left to stand;

remaining capacity detecting means for detecting a remaining capacity of said lithium secondary battery;

remaining capacity comparing means for comparing the remaining capacity detected by said remaining capacity detecting means with a predetermined remaining capacity at which said lithium secondary battery is expected to be deteriorated, when said left-to-stand condition detecting means detects when said lithium secondary battery is left to stand; and discharging means for discharging said lithium secondary battery if the remaining capacity detected by said remaining capacity detecting means is greater than said predetermined remaining capacity.

2. An apparatus according to claim 1, wherein said left-to-stand condition detecting means comprises means for detecting when said lithium secondary battery is left to stand if a signal indicative of the supply of electric energy from said lithium secondary battery to a load thereof is turned off.

3. An apparatus according to claim 1, further comprising:

temperature detecting means for detecting a battery temperature of said lithium secondary battery; and time measuring means for measuring time;

said discharging means comprising means for controlling said time measuring means to measure a predetermining period of time if the remaining capacity detected by said remaining capacity detecting means is greater than said predetermined remaining capacity and also if the battery temperature detected by said temperature detecting means is higher than a temperature at which said lithium secondary battery is likely to be deteriorated, and discharging said lithium secondary battery if said predetermined period of time elapses.

4. An apparatus according to claim 1, further comprising:

temperature detecting means for detecting a battery temperature of said lithium secondary battery;

said discharging means comprising means for increasing a discharging current with which to discharge said lithium secondary battery, in proportion to the detected remaining capacity and/or the detected battery temperature if the remaining capacity detected by said remaining capacity detecting means is greater than said predetermined remaining capacity and also if the battery temperature detected by said temperature detecting means is higher than a temperature at which said lithium secondary battery is likely to be deteriorated.

5. An apparatus according to claim 1, further comprising:

an electric energy storage medium connected to store electric energy discharged from said lithium secondary battery by said discharging means.

6. An apparatus for preventing a lithium secondary battery from being deteriorated, comprising:

a lithium secondary battery;

left-to-stand condition detecting means for detecting when said lithium secondary battery is left to stand;

a battery voltage detecting means for detecting a battery voltage across said lithium secondary battery;

a battery voltage comparing means for comparing the battery voltage detected by said battery voltage detecting means with a predetermined battery voltage at which said lithium secondary battery is expected to be deteriorated, when said left-to-stand condition detecting means detects when said lithium secondary battery is left to stand; and discharging means for discharging said lithium secondary battery if the battery voltage detected by said battery voltage detecting means is greater than said predetermined battery voltage.

7. An apparatus according to claim 6, wherein said left-to-stand condition detecting means comprises means for detecting when said lithium secondary battery is left to stand if a signal indicative of the supply of electric energy from said lithium secondary battery to a load thereof is turned off.

8. An apparatus according to claim 6, further comprising:

temperature detecting means for detecting a battery temperature of said lithium secondary battery; and time measuring means for measuring time;

said discharging means comprising means for controlling said time measuring means to measure a predetermining period of time if the battery voltage detected by said battery voltage detecting means is greater than said predetermined battery voltage and also if the battery temperature detected by said temperature detecting means is higher than a temperature at which said lithium secondary battery is likely to be deteriorated, and discharging said lithium secondary battery if said predetermined period of time elapses.

9. An apparatus according to claim 6, further comprising:

temperature detecting means for detecting a battery temperature of said lithium secondary battery;

said discharging means comprising means for increasing a discharging current with which to discharge said lithium secondary battery, in proportion to the detected battery voltage and/or the detected battery temperature if the battery voltage detected by said battery voltage detecting means is greater than said predetermined battery voltage and also if the battery temperature detected by said temperature detecting means is higher than a temperature at which said lithium secondary battery is likely to be deteriorated.

10. An apparatus according to claim 6, further comprising:

an electric energy storage medium connected to store electric energy discharged from said lithium secondary battery by said discharging means.

* * * * *